United States Patent
Kuusela (10) Patent No.: US 10,356,406 B2
(45) Date of Patent: Jul. 16, 2019

(54) REAL-TIME VIDEO ENCODER RATE CONTROL USING DYNAMIC RESOLUTION SWITCHING

(71) Applicant: Google Inc., Mountain View, CA (US)

(72) Inventor: Aki Kuusela, Palo Alto, CA (US)

(73) Assignee: GOOGLE LLC, Mountain View, CA (US)

(*) Notice: Subject to any disclaimer, the term of this patent is extended or adjusted under 35 U.S.C. 154(b) by 113 days.

(21) Appl. No.: 15/000,097

(22) Filed: Jan. 19, 2016

(65) Prior Publication Data

US 2017/0208328 A1 Jul. 20, 2017

(51) Int. Cl.
| H04N 19/124 | (2014.01) |
| H04N 19/167 | (2014.01) |
| H04N 19/85 | (2014.01) |
| H04N 19/90 | (2014.01) |
| H04N 19/146 | (2014.01) |
| H04N 19/59 | (2014.01) |

(52) U.S. Cl.
CPC ......... *H04N 19/124* (2014.11); *H04N 19/146* (2014.11); *H04N 19/167* (2014.11); *H04N 19/59* (2014.11); *H04N 19/85* (2014.11); *H04N 19/90* (2014.11)

(58) Field of Classification Search
CPC .................................................. H04N 19/124
USPC ....................................................... 375/240
See application file for complete search history.

(56) References Cited

U.S. PATENT DOCUMENTS

| 6,192,154 B1 | 2/2001 | Rajagopalan et al. |
| 6,343,098 B1* | 1/2002 | Boyce ............... H04N 19/176 |
| | | 375/240.03 |
| 6,650,704 B1 | 11/2003 | Carlson et al. |
| 6,674,796 B1 | 1/2004 | Haskell et al. |
| 6,728,315 B2 | 4/2004 | Haskell et al. |

(Continued)

FOREIGN PATENT DOCUMENTS

| AU | 2003248178 A1 | 10/2003 |
| EP | 1351517 A2 | 10/2003 |

(Continued)

OTHER PUBLICATIONS

Wilkins, "Real-time video with VP8/WebM." Retrieved from http://webm.googlecode.com/files/realtime_VP8_2-9-2011.pdf.

(Continued)

*Primary Examiner* — Christopher S Kelley
*Assistant Examiner* — Asmamaw G Tarko
(74) *Attorney, Agent, or Firm* — Young Basile Hanlon & MacFarlane, P.C.

(57) ABSTRACT

Dynamic resolution switching achieves a target bitrate for single-pass and two-pass encoding of a video stream. A single-pass encoder determines whether an encoding bitrate for a frame meets a target bitrate. If not, a quantization parameter used to encode the frame is compared against minimum and maximum threshold values to determine whether the video resolution needs to be adjusted. A two-pass encoder encodes an input frame using a quantization parameter and determines whether video resolution for encoding the frame during a second pass may be adjusted based on the bitrate at which the input frame is encoded. The resolution may be adjusted based on encoder limitations with respect to a motion search area used to code a frame.

16 Claims, 8 Drawing Sheets

(56) References Cited

U.S. PATENT DOCUMENTS

| | | | |
|---|---|---|---|
| 6,785,334 B2 | 8/2004 | van der Schaar et al. | |
| 6,996,179 B2 * | 2/2006 | Rovati | H04N 19/433 375/240.16 |
| 7,602,997 B2 | 10/2009 | Young | |
| 8,189,671 B2 * | 5/2012 | Wang | H04N 19/56 375/240.12 |
| 8,250,618 B2 | 8/2012 | Rosenweig et al. | |
| 8,396,114 B2 * | 3/2013 | Gu | H04N 21/23439 370/235 |
| 2002/0071052 A1 | 6/2002 | Itoh et al. | |
| 2003/0053544 A1 * | 3/2003 | Yasunari | H04N 5/145 375/240.16 |
| 2003/0202712 A1 * | 10/2003 | Stefan Porter | H04N 19/197 382/251 |
| 2005/0008077 A1 * | 1/2005 | Weatherspoon | H04N 19/42 375/240.24 |
| 2005/0169370 A1 * | 8/2005 | Lee | H04N 19/124 375/240.03 |
| 2006/0056511 A1 * | 3/2006 | Rehan | H04N 19/61 375/240.12 |
| 2006/0114990 A1 | 6/2006 | Pak | |
| 2007/0263720 A1 | 11/2007 | He | |
| 2009/0110062 A1 * | 4/2009 | Au | H04N 19/44 375/240.03 |
| 2009/0187955 A1 | 7/2009 | Sullivan et al. | |
| 2012/0154370 A1 | 6/2012 | Russell et al. | |
| 2013/0058393 A1 * | 3/2013 | Soroushian | H04N 21/234372 375/240.01 |
| 2013/0156098 A1 | 6/2013 | Schwartz et al. | |
| 2014/0376617 A1 * | 12/2014 | Yang | H04N 19/147 375/240.03 |
| 2015/0189297 A1 * | 7/2015 | Chevance | H04N 19/61 375/240.03 |

FOREIGN PATENT DOCUMENTS

| | | |
|---|---|---|
| EP | 1351519 A2 | 10/2003 |
| EP | 2290984 A1 | 3/2011 |
| EP | 2579593 A1 | 4/2013 |
| JP | 2006180173 A | 7/2006 |

OTHER PUBLICATIONS

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

VP6 Bitstream and Decoder Specification, Version 1.02, (On2 Technologies, Inc.), Dated Aug. 17, 2006.

VP6 Bitstream and Decoder Specification, Version 1.03, (On2 Technologies, Inc.), Dated Oct. 29, 2007.

"VP8 Data Format and Decoding Guide, WebM Project", Google On2, Dec. 1, 2010, 103 pp.

Combined Search and Examination Report in corresponding foreign Application No. GB1621731.7, dated May 24, 2017.

* cited by examiner

REAL-TIME VIDEO ENCODER RATE CONTROL USING DYNAMIC RESOLUTION SWITCHING

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Due to the large amount of data involved in video data, high performance compression is needed for transmission and storage. Further, it is desirable to be able to stream quality video data at optimized resolutions based on available connections.

SUMMARY

Disclosed herein are aspects of systems, methods, and apparatuses for using dynamic resolution switching to achieve a target bitrate for encoding a video stream. An apparatus according to one aspect of the disclosure comprises at least one processor configured to execute instructions stored in a non-tangible storage medium to identify a first frame of the plurality of frames, encode the first frame at a first bitrate representative of a quantization parameter, identify one or more encoder limitations with respect to a motion search area in response to encoding the first frame, compare the first bitrate to a target bitrate for the first frame and compare the quantization parameter to one of a minimum quantization threshold and a maximum quantization threshold, adjust at least one encoding parameter in response to comparing the first bitrate to the target bitrate and comparing the quantization parameter to the one of the minimum quantization threshold and the maximum quantization threshold, identify a second frame of the video stream, encode the second frame at a second bitrate using the adjusted at least one encoding parameter, and transmit the encoded first frame and the encoded second frame in an output bitstream.

An apparatus according to another aspect of the disclosure comprises at least one processor configured to execute instructions stored in a non-tangible storage medium to identify an input frame of the plurality of frames, encode the input frame using an input quantization parameter, identify one or more encoder limitations with respect to a motion search area in response to encoding the input frame, generate a number of bits in response to encoding the input frame, adjust at least one encoding parameter based on the number of bits and a target bitrate for encoding the input frame, generate an encoded frame by encoding the input frame using the at least one encoding parameter, and transmit the encoded frame in an output bitstream.

An apparatus according to another aspect of the disclosure comprises at least one processor configured to execute instructions stored in a non-tangible storage medium to identify an input frame of the plurality of frames, encode the input frame at a first bitrate representative of a constant quantization parameter, identify one or more encoder limitations with respect to a motion search area in response to encoding the input frame, compare the first bitrate to one of a minimum target bitrate and a maximum target bitrate for the input frame, adjust at least one encoding parameter in response to comparing the first bitrate to the one of the minimum target bitrate and the maximum target bitrate, generate an encoded frame by encoding the input frame using the at least one encoding parameter, and transmit the encoded frame in an output bitstream.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Moreover, like numbers refer to like elements within the various figures.

DETAILED DESCRIPTION

Rate control algorithms in video encoders aim to keep the encoder producing constant bitrate when the complexity of the input data varies over time. Constant bitrate can be achieved by adjusting a quantization parameter (QP) for each frame, based on the amount of bits the previous frame(s) have generated. Generally, higher quantization reduces bitrate and lower quantization increases it. The quantization parameter is indicative of a scale at which data of a video stream is quantized by an encoder. That is, where a higher quantization parameter is used by an encoder, the quantization stage involves a higher reduction in video data for higher quantization parameters and a lower reduction in video data for lower quantization parameters. The resulting, quantized video data is indicative of a bitrate at which a frame of a video stream comprising the data is encoded. Generally, for a given frame of a video stream, use of a higher quantization parameter would result in a lower frame bitrate, and use of a lower quantization parameter would result in a higher frame bitrate.

Nevertheless, depending on the complexity of the video sequence and various capabilities of the encoder, there may be cases where a target bitrate cannot be met for encoding a given video stream. This may be because the QP has already been capped to a maximum value threshold (e.g., a value for the QP where further increases reduce video quality relative to the resolution by producing obvious visual artifacts), yet the bitrate still is not low enough, resulting in a bitrate overshoot. Alternatively, the use of a large QP may result in coding artifacts detrimental to video quality. Similarly, if the desire is to optimize the video quality for a user at a given bandwidth and the QP has reached a minimum value threshold (e.g., a value for the QP where further decreases do not have an effect on improving the video quality relative to the resolution), there may not be a way to further improve video quality. Thus, the user experience suffers.

Figure 1A:
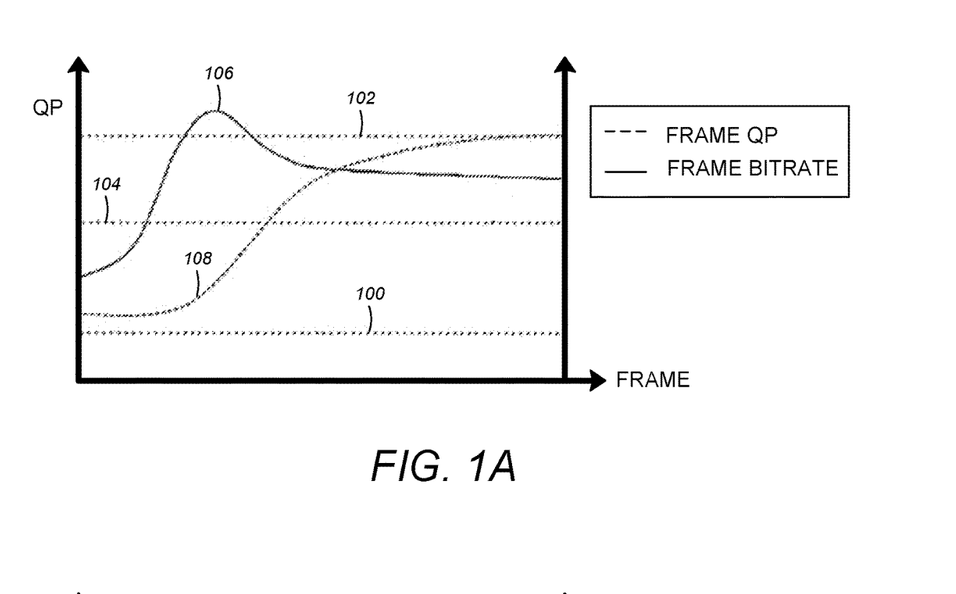
FIG. 1A is a graph showing a target bitrate for encoding a video stream being overshot due to a maximized quantization parameter.
Figure 1B:
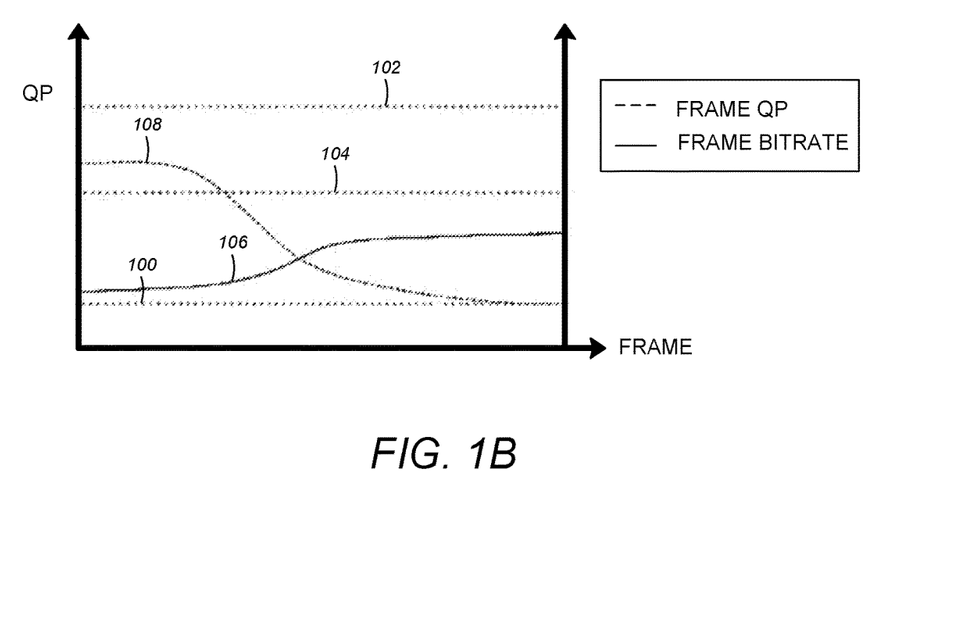
FIG. 1B is a graph showing a target bitrate for encoding a video stream being undershot due to a minimized quantization parameter.

FIGS. 1A and 1B are graphs showing a target bitrate for encoding a video stream being respectively overshot due to a maximized quantization parameter and undershot due to a minimized quantization parameter. The horizontal axes indicate the consecutive progression of frames of a video stream being encoded by an encoder, and the vertical axes indicate a quantization parameter used in a quantization stage of the encoder for a given frame. The minimum QP threshold 100 and the maximum QP threshold 102 for encoding frames of the video stream are shown as constant values relative to the target bitrate 104. The figures further indicate that, depending on the data being encoded, the target bitrate 104 may not be obtainable merely by increasing or decreasing the QP 106. The frame bitrate 108 may fluctuate, for example due to the complexity of encoding the input data comprising a given frame.

As shown in FIG. 1A, the frame bitrate 108 increases as the data of the video stream becomes more complex. In response to an increase in the frame bitrate 108, the encoder increases the QP 106 in an attempt to maintain the target bitrate 104 for the video stream. Eventually, however, the QP 106 reaches the maximum QP threshold 102 and thus cannot be further increased, yet the frame bitrate 108 has still not reached the target bitrate 104 because the data being encoded remains too large to achieve the target bitrate 104. This is referred to as a bitrate overshoot, since the frame bitrate 108 is still above the target bitrate 104 despite the maximum QP threshold 102 being capped. Similarly, as shown in FIG. 1B, the encoder may decrease the QP 106 where it determines that the target bitrate 104 is not achieved because the frame bitrate 108 is too low. However, a bitrate undershoot results if the frame bitrate 108 remains below the target bitrate 104 despite the minimum QP threshold 100 being reached.

Accordingly, conventional encoders are unable to achieve a constant bitrate for encoding video data by mere adjustment of a QP. Further, while some encoders may insert a key frame for encoding, that solution is not optimal for at least the reason that it necessarily causes a bitrate peak when coding the key frame. In contrast, the present disclosure describes dynamic reference frame scaling to improve the performance of rate control by switching resolution during encoding. Rate control is thus accomplished, for example, by the encoder internally scaling the reference frame prior to forming the prediction signal therefor. Single-pass and two-pass encoders for encoding a video stream are described. In a two-pass encoder, a first pass encodes frames of a video stream using a constant quantizer, and a second pass optimally allocates bits for each frame knowing ahead which frames are complex and which are easy. Further details of the dynamic reference frame scaling are described herein with initial reference to a system in which it can be implemented.

Figure 2:
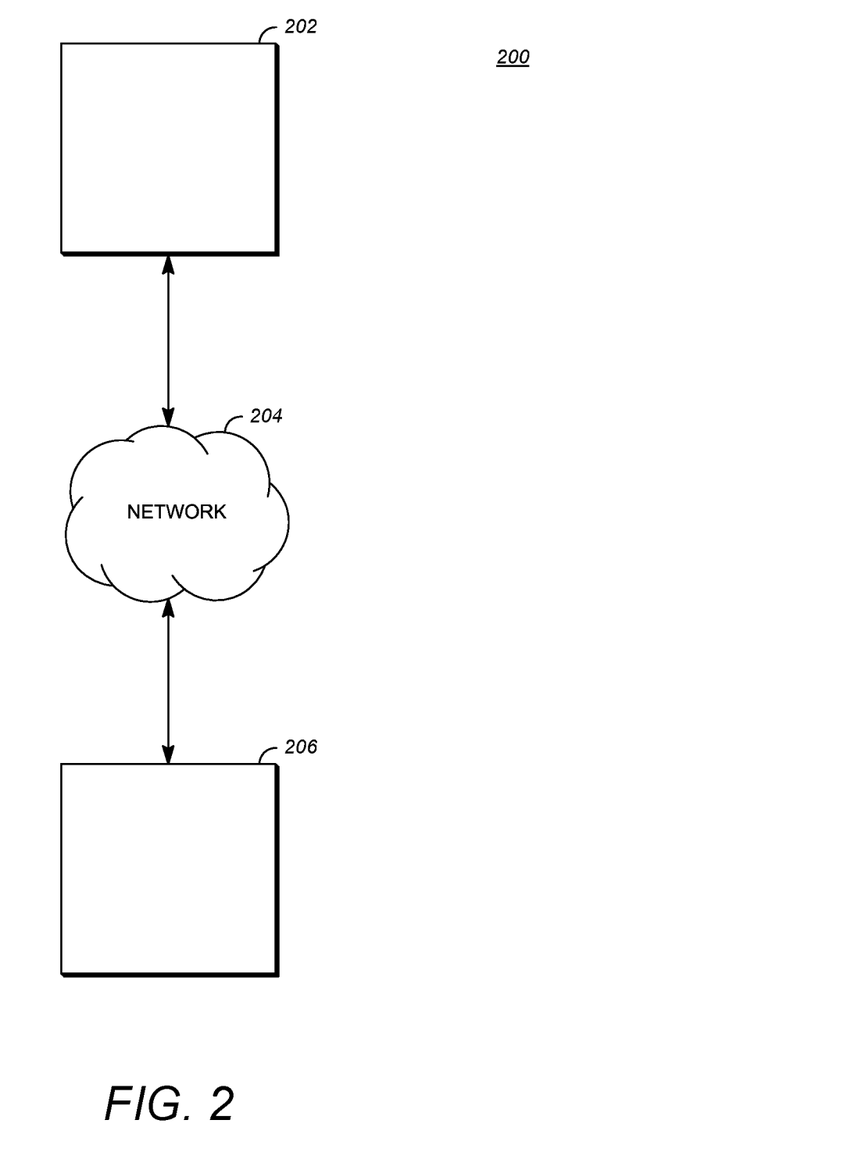
FIG. 2 is a schematic of a video encoding and decoding system.

FIG. 2 is a schematic of a video encoding and decoding system 200. A transmitting station 202 can be, for example, a computer having an internal configuration of hardware such as that described in FIG. 3. However, other suitable implementations of the transmitting station 202 are possible. For example, the processing of the transmitting station 202 can be distributed among multiple devices.

A network 204 can connect the transmitting station 202 and a receiving station 206 for encoding and decoding of the video stream. Specifically, the video stream can be encoded in the transmitting station 202 and the encoded video stream can be decoded in the receiving station 206. The network 204 can be, for example, the Internet. The network 204 can also be a local area network (LAN), wide area network (WAN), virtual private network (VPN), cellular telephone network or any other means of transferring the video stream from the transmitting station 202 to, in this example, the receiving station 206.

Figure 3:
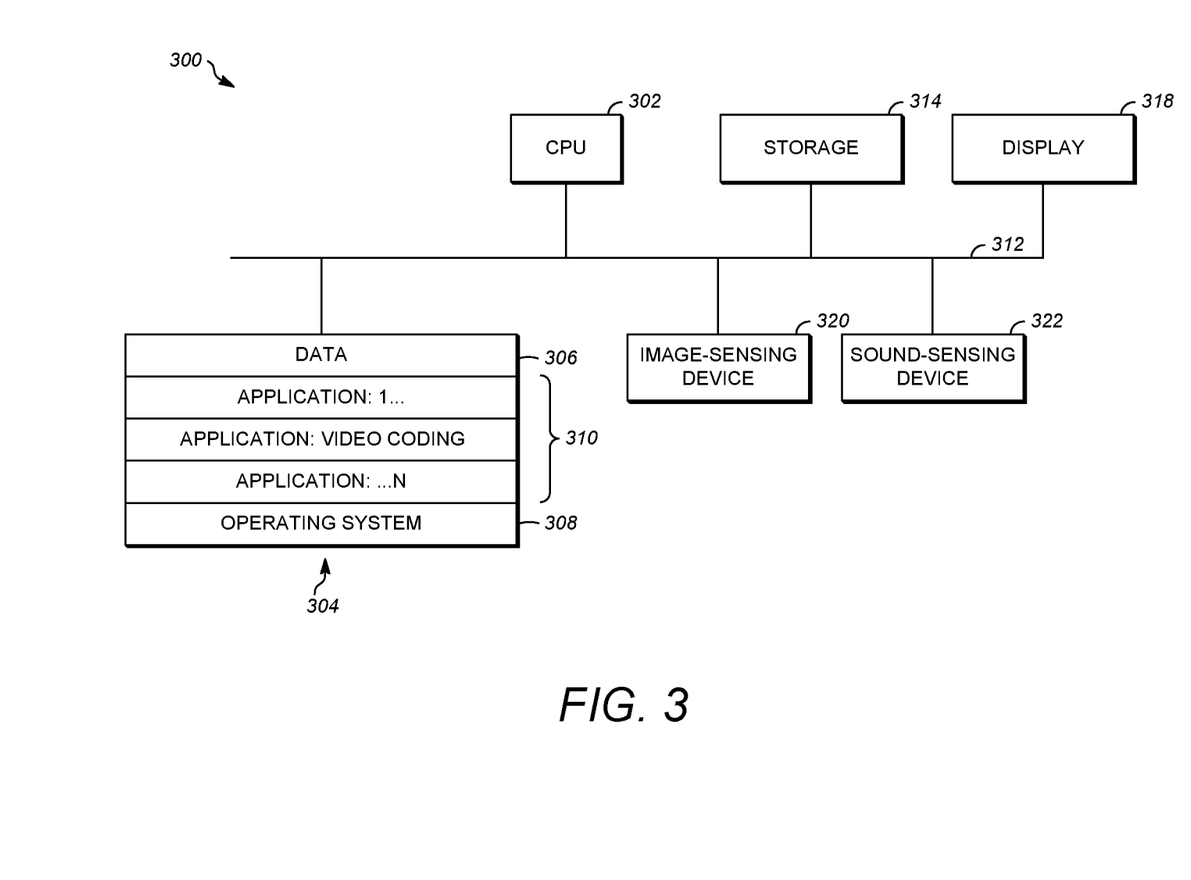
FIG. 3 is a block diagram of an example of a computing device that can implement a transmitting station or a receiving station.

The receiving station 206, in one example, can be a computer having an internal configuration of hardware such as that described in FIG. 3. However, other suitable implementations of the receiving station 206 are possible. For example, the processing of the receiving station 206 can be distributed among multiple devices.

Other implementations of the video encoding and decoding system 200 are possible. For example, an implementation can omit the network 204. In another implementation, a video stream can be encoded and then stored for transmission at a later time to the receiving station 206 or any other device having memory. In one implementation, the receiving station 206 receives (e.g., via the network 204, a computer bus, and/or some communication pathway) the encoded video stream and stores the video stream for later decoding. In an example implementation, a real-time transport protocol (RTP) is used for transmission of the encoded video over the network 204. In another implementation, a transport protocol other than RTP may be used, e.g., an HTTP-based video streaming protocol.

When used in a video conferencing system, for example, the transmitting station 202 and/or the receiving station 206 may include the ability to both encode and decode a video stream as described below. For example, the receiving station 206 could be a video conference participant who receives an encoded video bitstream from a video conference server (e.g., the transmitting station 202) to decode and view and further encodes and transmits its own video bitstream to the video conference server for decoding and viewing by other participants.

FIG. 3 is a block diagram of an example of a computing device 300 that can implement a transmitting station or a receiving station. For example, the computing device 300 can implement one or both of the transmitting station 202 and the receiving station 206 of FIG. 2. The computing device 300 can be in the form of a computing system including multiple computing devices, or in the form of a single computing device, for example, a mobile phone, a tablet computer, a laptop computer, a notebook computer, a desktop computer, and the like.

A CPU 302 in the computing device 300 can be a conventional central processing unit. Alternatively, the CPU 302 can be any other type of device, or multiple devices, capable of manipulating or processing information now-existing or hereafter developed. Although the disclosed implementations can be practiced with a single processor as shown, e.g., the CPU 302, advantages in speed and efficiency can be achieved using more than one processor.

A memory 304 in computing device 300 can be a read only memory (ROM) device or a random access memory (RAM) device in an implementation. Any other suitable type of storage device can be used as the memory 304. The memory 304 can include code and data 306 that is accessed by the CPU 302 using a bus 312. The memory 304 can further include an operating system 308 and application programs 310, the application programs 310 including at least one program that permits the CPU 302 to perform the methods described here. For example, the application programs 310 can include applications 1 through N, which further include a video coding application that performs the methods described here. Computing device 200 can also include a secondary storage 314, which can, for example, be a memory card used with a mobile computing device 300. Because the video communication sessions may contain a significant amount of information, they can be stored in whole or in part in the secondary storage 314 and loaded into the memory 304 as needed for processing.

The computing device 300 can also include one or more output devices, such as a display 318. The display 318 may be, in one example, a touch sensitive display that combines a display with a touch sensitive element that is operable to sense touch inputs. The display 318 can be coupled to the CPU 302 via the bus 312. Other output devices that permit a user to program or otherwise use the computing device 300 can be provided in addition to or as an alternative to the display 318. When the output device is or includes a display, the display can be implemented in various ways, including by a liquid crystal display (LCD), a cathode-ray tube (CRT) display or light emitting diode (LED) display, such as an OLED display.

The computing device 300 can also include or be in communication with an image-sensing device 320, for example a camera, or any other image-sensing device 320 now existing or hereafter developed that can sense an image such as the image of a user operating the computing device 300. The image-sensing device 320 can be positioned such that it is directed toward the user operating the computing device 300. In an example, the position and optical axis of the image-sensing device 320 can be configured such that the field of vision includes an area that is directly adjacent to the display 318 and from which the display 318 is visible.

The computing device 300 can also include or be in communication with a sound-sensing device 322, for example a microphone, or any other sound-sensing device now existing or hereafter developed that can sense sounds near the computing device 300. The sound-sensing device 322 can be positioned such that it is directed toward the user operating the computing device 300 and can be configured to receive sounds, for example, speech or other utterances, made by the user while the user operates the computing device 300.

Although FIG. 3 depicts the CPU 302 and the memory 304 of the computing device 300 as being integrated into a single unit, other configurations can be utilized. The operations of the CPU 302 can be distributed across multiple machines (each machine having one or more of processors) that can be coupled directly or across a local area or other network. The memory 304 can be distributed across multiple machines such as a network-based memory or memory in multiple machines performing the operations of the computing device 300. Although depicted here as a single bus, the bus 312 of the computing device 300 can be composed of multiple buses. Further, the secondary storage 314 can be directly coupled to the other components of the computing device 300 or can be accessed via a network and can comprise a single integrated unit such as a memory card or multiple units such as multiple memory cards. The computing device 300 can thus be implemented in a wide variety of configurations.

Figure 4:
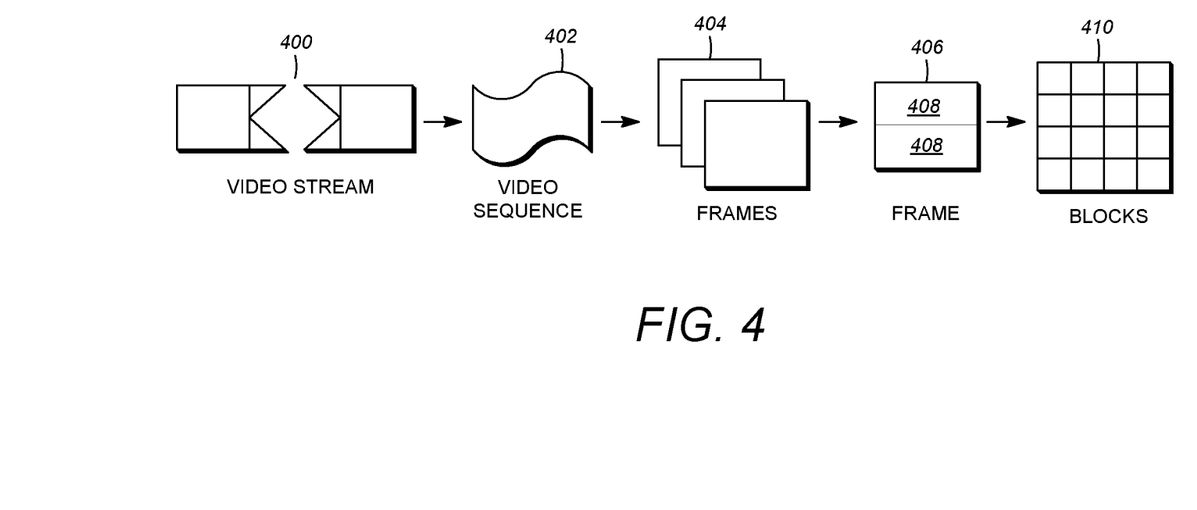
FIG. 4 is a diagram of a typical video stream to be encoded and subsequently decoded.

FIG. 4 is a diagram of an example of a video stream 400 to be encoded and subsequently decoded. The video stream 400 includes a video sequence 402. At the next level, the video sequence 402 includes a number of adjacent frames 404. While three frames are depicted as the adjacent frames 404, the video sequence 402 can include any number of adjacent frames 404. The adjacent frames 404 can then be further subdivided into individual frames, e.g., a single frame 406. At the next level, the single frame 406 can be divided into a series of segments or planes 408. The segments (or planes) 408 can be subsets of frames that permit parallel processing, for example. The segments 408 can also be subsets of frames that can separate the video data into separate colors. For example, a frame 406 of color video data can include a luminance plane and two chrominance planes. The segments 408 may be sampled at different resolutions.

Whether or not the frame 406 is divided into segments 408, the frame 406 may be further subdivided into blocks 410, which can contain data corresponding to, for example, 16×16 pixels in the frame 406. The blocks 410 can also be arranged to include data from one or more planes 408 of pixel data. The blocks 410 can also be of any other suitable size such as 4×4 pixels, 8×8 pixels, 16×8 pixels, 8×16 pixels, 16×16 pixels or larger. Unless otherwise noted, the terms block and macroblock are used interchangeably herein.

Figure 5:
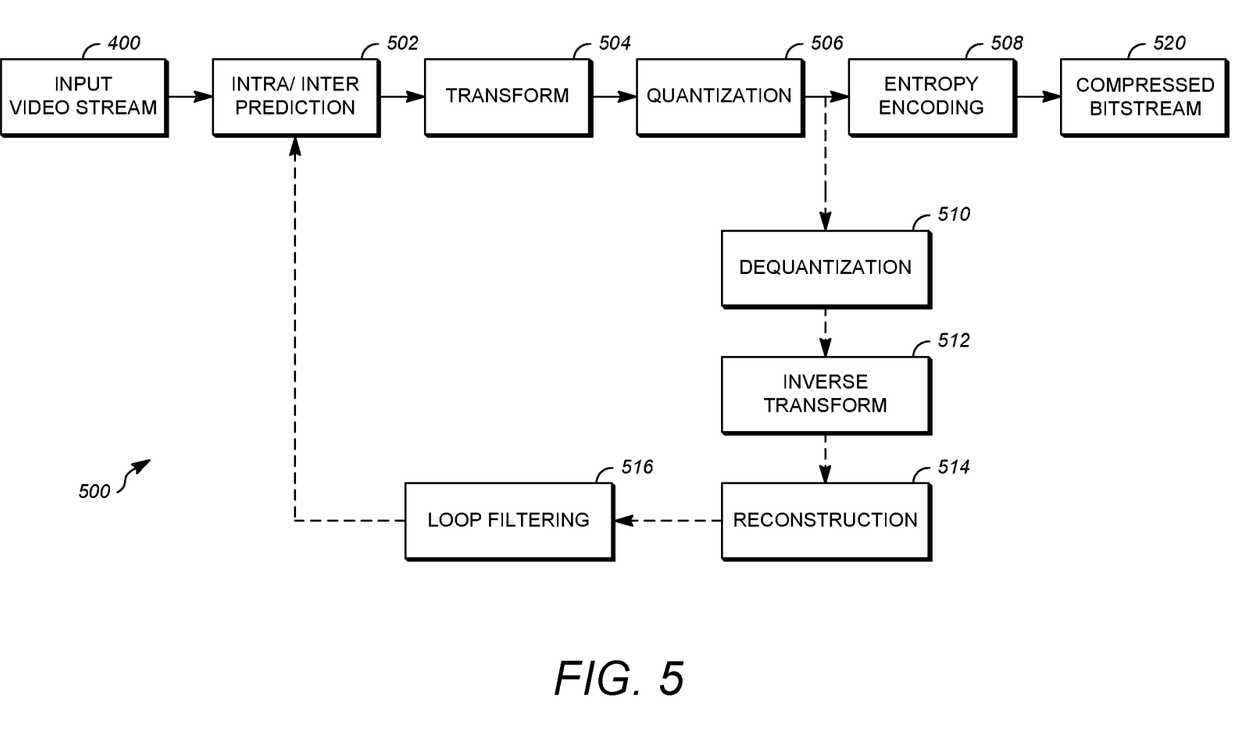
FIG. 5 is a block diagram of a video compression system in according to an aspect of the teachings herein.

FIG. 5 is a block diagram of an encoder 500 in accordance with an implementation. The encoder 500 can be implemented, as described above, in the transmitting station 202 such as by providing a computer software program stored in memory, for example, the memory 304. The computer software program can include machine instructions that, when executed by a processor such as the CPU 302, cause the transmitting station 202 to encode video data in the manner described in FIG. 5. The encoder 500 can also be implemented as specialized hardware included in, for example, the transmitting station 202. In one particularly desirable implementation, the encoder 500 is a hardware encoder. The encoder 500 has the following stages to perform the various functions in a forward path (shown by the solid connection lines) to produce an encoded or compressed bitstream 520 using the input video stream 400: an intra/inter prediction stage 502, a transform stage 504, a quantization stage 506, and an entropy encoding stage 508. The encoder 500 may also include a reconstruction path (shown by the dotted connection lines) to reconstruct a frame for encoding of future blocks. In FIG. 5, the encoder 500 has the following stages to perform the various functions in the reconstruction path: a dequantization stage 510, an inverse transform stage 512, a reconstruction stage 514, and a loop filtering stage 516. Other structural variations of the encoder 500 can be used to encode video stream 400.

When the video stream 400 is presented for encoding, each frame 406 can be processed in units of blocks. At the intra/inter prediction stage 502, each block can be encoded using intra-frame prediction (also called intra prediction) or inter-frame prediction (also called inter prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 5, the prediction block can be subtracted from the current block at the intra/inter prediction stage 502 to produce a residual block (also called a residual). The transform stage 504 transforms the residual into transform coefficients in, for example, the frequency domain using block-based transforms. The quantization stage 506 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 508. The entropy-encoded coefficients, together with other information used to decode the block, which may include for example the type of prediction used, transform type, motion vectors and quantizer value, are then output to the compressed bitstream 520. The compressed bitstream 520 can be formatted using various techniques, such as variable length coding (VLC) or arithmetic coding. The compressed bitstream 520 can also be referred to as an encoded video stream or encoded video bitstream, and the terms will be used interchangeably herein.

The reconstruction path in FIG. 5 (shown by the dotted connection lines) can be used to ensure that both the encoder 500 and a decoder 600 (described below) use the same reference frames to decode the compressed bitstream 520. The reconstruction path performs functions that are similar to functions that take place during the decoding process that are discussed in more detail below, including dequantizing the quantized transform coefficients at the dequantization stage 510 and inverse transforming the dequantized transform coefficients at the inverse transform stage 512 to produce a derivative residual block (also called a derivative residual). At the reconstruction stage 414, the prediction block that was predicted at the intra/inter prediction stage 502 can be added to the derivative residual to create a reconstructed block. The loop filtering stage 516 can be applied to the reconstructed block to reduce distortion such as blocking artifacts.

Other variations of the encoder 500 can be used to encode the compressed bitstream 520. For example, a non-transform based encoder can quantize the residual signal directly without the transform stage 504 for certain blocks or frames. In another implementation, an encoder can have the quantization stage 506 and the dequantization stage 510 combined into a single stage.

Figure 6:
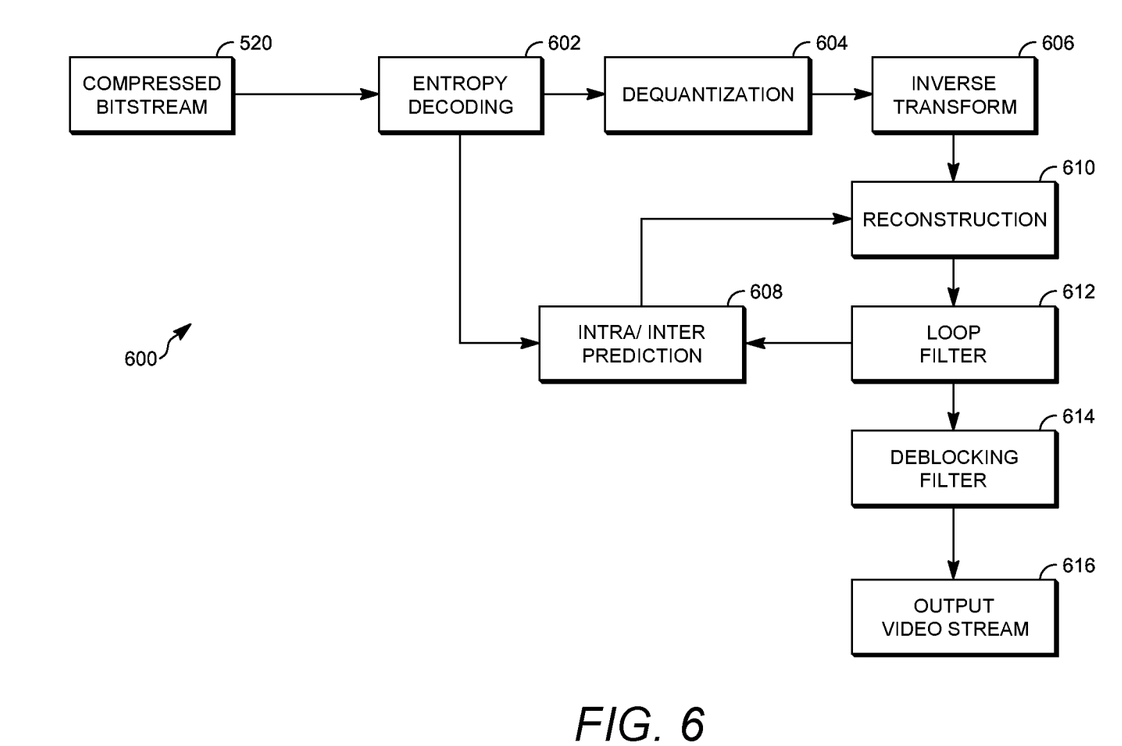
FIG. 6 is a block diagram of a video decompression system according to another aspect of the teachings herein.

FIG. 6 is a block diagram of a decoder 600 in accordance with another implementation. The decoder 600 can be implemented in the receiving station 206, for example, by providing a computer software program stored in the memory 304. The computer software program can include machine instructions that, when executed by a processor such as the CPU 302, cause the receiving station 206 to decode video data in the manner described in FIG. 6. The decoder 600 can also be implemented in hardware included in, for example, the transmitting station 202 or the receiving station 206.

The decoder 600, similar to the reconstruction path of the encoder 500 discussed above, includes in one example the following stages to perform various functions to produce an output video stream 616 from the compressed bitstream 520: an entropy decoding stage 602, a dequantization stage 604, an inverse transform stage 606, an intra/inter prediction stage 508, a reconstruction stage 610, a loop filtering stage 612 and a deblocking filtering stage 614. Other structural variations of the decoder 600 can be used to decode the compressed bitstream 520.

When the compressed bitstream 520 is presented for decoding, the data elements within the compressed bitstream 520 can be decoded by the entropy decoding stage 602 to produce a set of quantized transform coefficients. The dequantization stage 604 dequantizes the quantized transform coefficients (e.g., by multiplying the quantized transform coefficients by the quantizer value), and the inverse transform stage 606 inverse transforms the dequantized transform coefficients to produce a derivative residual that can be identical to that created by the inverse transform stage 512 in the encoder 500. Using header information decoded from the compressed bitstream 520, the decoder 600 can use the intra/inter prediction stage 608 to create the same prediction block as was created in the encoder 500, e.g., at the intra/inter prediction stage 502. At the reconstruction stage 610, the prediction block can be added to the derivative residual to create a reconstructed block. The loop filtering stage 612 can be applied to the reconstructed block to reduce blocking artifacts. Other filtering can be applied to the reconstructed block. In this example, the deblocking filtering stage 614 is applied to the reconstructed block to reduce blocking distortion, and the result is output as the output video stream 616. The output video stream 616 can also be referred to as a decoded video stream, and the terms will be used interchangeably herein. Other variations of the decoder 600 can be used to decode the compressed bitstream 520. For example, the decoder 600 can produce the output video stream 616 without the deblocking filtering stage 614.

Figure 7:
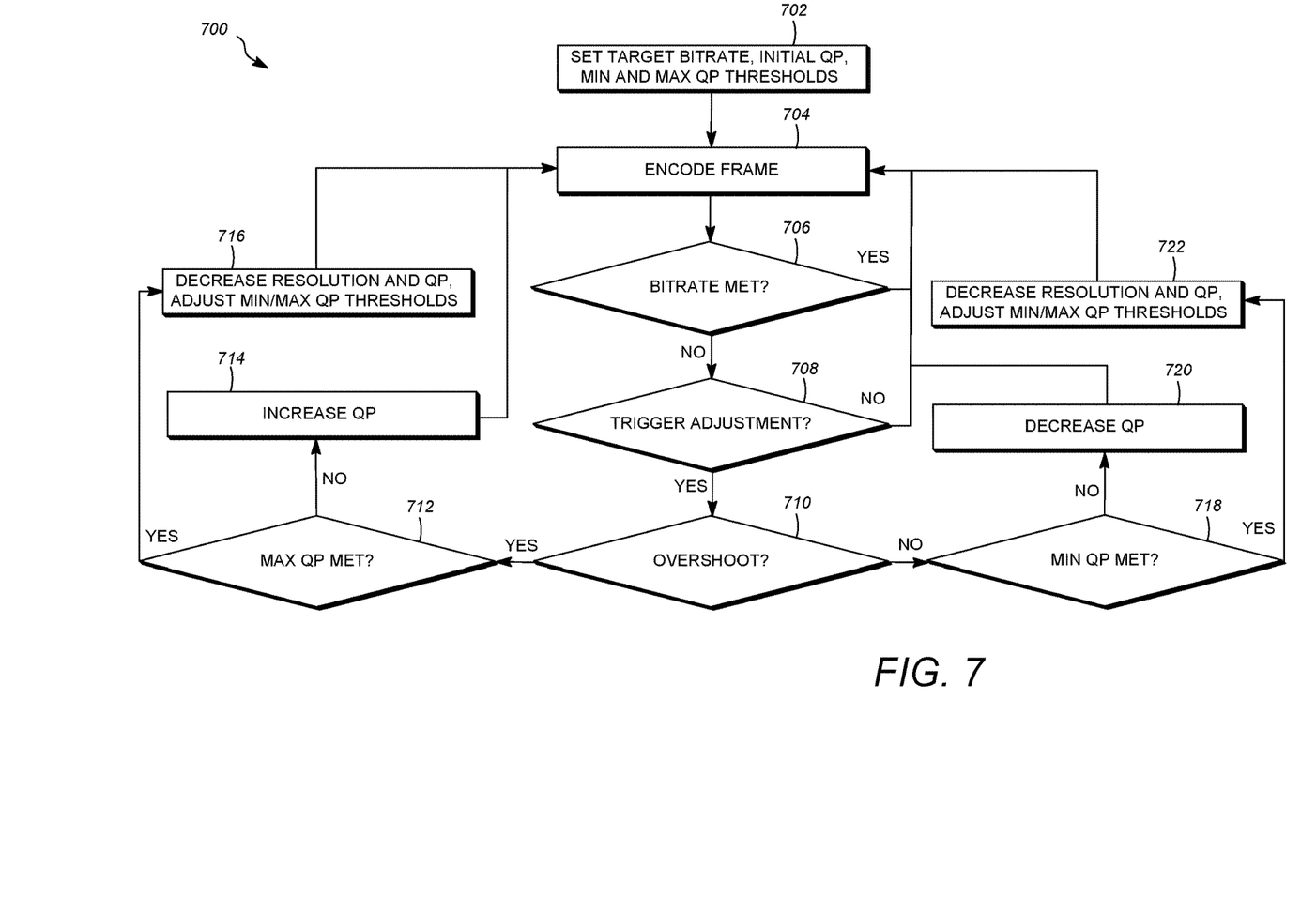
FIG. 7 is a flowchart diagram of an example of a process for achieving a target encoding bitrate in single-pass encoding.
Figure 8:
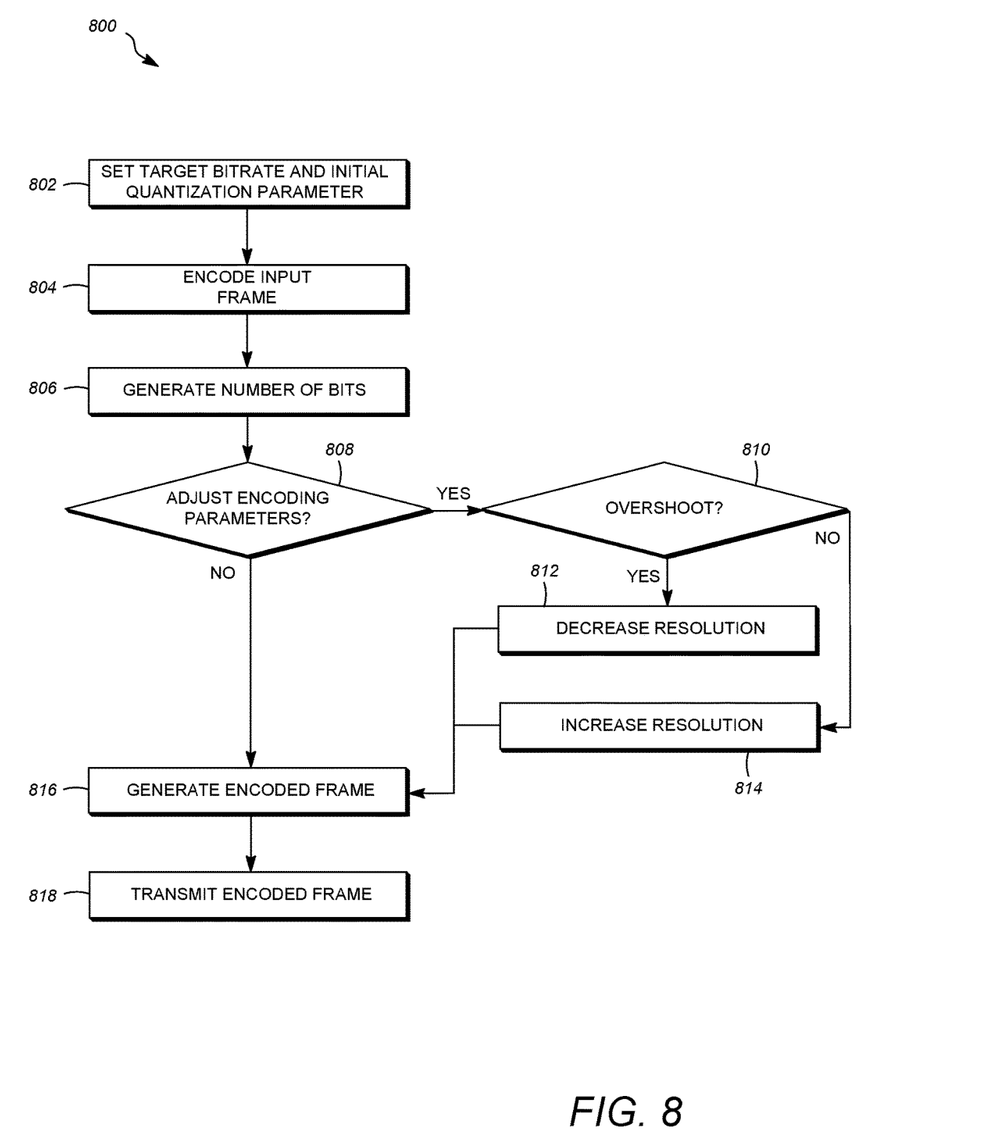
FIG. 8 is a flowchart diagram of an example of a process for achieving a target encoding bitrate in two-pass encoding.

FIGS. 7 and 8 are flowchart diagrams of processes 700 and 800 for using resolution scaling to achieve a constant target bitrate in single-pass and two-pass encoding, respectively. The processes 700 and 800 can be implemented in a system such as the computing device 300 to aid the encoding of a video stream. The processes 700 and 800 can be implemented, for example, as a software program that is executed by a computing device such as the transmitting station 202 or the receiving station 206. The software program can include machine-readable instructions that are stored in a memory such as the memory 304 that, when executed by a processor such as the CPU 302, cause the computing device to perform one of the process 700 or the process 800. The processes 700 and 800 can also be implemented using hardware in whole or in part. As explained above, some computing devices may have multiple memories and multiple processors, and the steps or operations of each of the processes 700 and 800 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, each process 700 and 800 is depicted and described as a series of steps or operations. However, steps and operations in accordance with this disclosure can occur in various orders and/or concurrently. Additionally, steps or operations in accordance with this disclosure may occur with other steps or operations not presented and described herein. Furthermore, not all illustrated steps or operations may be required to implement a method in accordance with the disclosed subject matter. One of the processes 700 or 800 may be repeated for each frame of the input signal.

Referring to FIG. 7, the process 700 for using resolution scaling in single-pass encoding to achieve a relatively constant target bitrate initiates by setting values for a target bitrate, initial QP, minimum QP threshold, and maximum QP threshold at operation 702. These values may be indicative of an initial resolution at which the video stream is being encoded. At operation 704, an encoder encodes a first frame of the video stream using the initial QP. If encoding the first frame results in a frame bitrate that meets the target bitrate, operation 706 prepares the encoder for encoding the next frame of the video stream by returning to operation 704. Otherwise, the process 700 continues to a trigger adjustment phase of operation 708, which uses filtering logic to determine whether there are oscillations in the video data. If there are no oscillations, operation 708 prepares the encoder for encoding the next frame of the video stream by returning to operation 704. Otherwise, the process 700 continues to an adjustment phase initiated at operation 710.

At operation 710, it is determined whether the frame bitrate not meeting the target bitrate is due to an overshot or an undershot. An overshot occurs where the frame bitrate exceeds (overshoots) the target bitrate, for example, because the QP is too low for the resolution at which the video stream is being encoded. An undershot occurs where the frame bitrate is below (undershoots) the target bitrate, for example, because the QP is too high for the resolution at which the video stream is being encoded. Regardless of whether an overshot or undershot is determined, one or more encoding parameters of the video stream will hereinafter be adjusted in order to improve the quality of the video stream. Encoding parameters may include any values that, when adjusted, have an effect on the quality or visual representations of the video stream. In an implementation, the encoding parameters include, without limitation, the QP, the video resolution, the maximum QP threshold, and the minimum QP threshold. The adjustments hereinafter made by the encoder depend upon whether the bitrate issue is due to an overshot or undershot.

If operation 710 determines that there is a bitrate overshot, the process 700 proceeds to operation 712 wherein it is determined whether the value presently set for the QP (which may be the initial QP set at operation 702 where operation 710 has only been performed once) equals the value presently set for the maximum QP threshold. If it does not, the QP is increased at operation 714, which operation prepares the encoder for encoding the next frame of the video stream using the increased QP by returning to operation 704. However, if the value of the QP is equal to the value for the maximum QP threshold, the QP cannot be further increased, as it has reached a highest effective value relative to the resolution of the video stream. Thus, at operation 716, the process 700 decreases the resolution of the video stream, which includes resetting the values of the minimum QP threshold and maximum QP threshold. Operation 716 also decreases the value of the QP based on the decrease in resolution. Operation 716 then prepares the encoder for encoding the next frame using the new resolution and QP, minimum QP threshold, and maximum QP threshold values by returning to operation 704.

If operation 710 instead determines that there is a bitrate undershot, the process 700 proceeds to operation 718 wherein it is determined whether the value presently set for the QP (which may be the initial QP set at operation 702 where operation 710 has only been performed once) equals the value presently set for the minimum QP threshold. If it does not, the QP is decreased at operation 720, which operation prepares the encoder for encoding the next frame of the video stream using the decreased QP by returning to operation 704. However, if the value of the QP is equal to the value for the minimum QP threshold, the QP cannot be further decreased, as it has reached a lowest effective value relative to the resolution of the video stream. Thus, at operation 722, the process 700 increases the resolution of the video stream, which includes resetting the values of the minimum QP threshold and maximum QP threshold. Operation 722 also increases the value of the QP based on the increase in resolution. Operation 722 then prepares the encoder for encoding the next frame using the new resolution and QP, minimum QP threshold, and maximum QP threshold values by returning to operation 704.

Provided a higher resolution source is available, another option is to increase video resolution where the encoding bitrate consistently undershoots the target bitrate, or undershoots the target bitrate above a certain threshold number of times. For example, where a user selects to view a video at 360p resolution, but his or her bandwidth allows for viewing at a higher resolution, the video resolution may be increased to a maximum resolution at which the user can stream the video over his or her connection.

In two-pass encoding, a first pass for encoding frames of a video stream includes determining which frames may be too difficult or too easy to encode based on a constant quantization parameter, for example, by detecting a number of bits generated by encoding an input frame corresponding to a first frame of the video stream. If the generated number of bits indicates that the input frame is too difficult or too easy, the encoder may adjust the resolution of the video stream upon a second pass of encoding the corresponding frame. In this way, two-pass encoding may prevent most undershooting and overshooting by identifying potential instances of same during a first pass and making necessary adjustments to encode the video stream effectively on a second pass. The amount of the undershoot or overshoot may indicate the degree to which resolution need be adjusted per dimension.

Referring now to FIG. 8, the process 800 for using resolution scaling in two-pass encoding to achieve a relatively constant target bitrate initiates at operation 802 by setting initial values for a target bitrate and QP. At operation 804, an input frame is received and encoded using the set target bitrate and QP values. In response to encoding the input frame, a number of bits is generated at operation 806. The number of bits is indicative of a bitrate at which the input frame is encoded. Depending on the size of the bits generated, the process 800 may proceed to an adjustment phase for adjusting the encoding parameters of the video stream, such as the video resolution. In an implementation, the determination as to whether to proceed to an adjustment phase may be made based on whether the frame bitrate falls outside of a specified range within which varying the QP results in desirable video quality (e.g., video streaming without visible coding artifacts relative to the resolution). For example, if the frame bitrate is within 100 to 200 kbps of the target bitrate, operation 808 may determine not to proceed to an adjustment phase. In the event no adjustments are to be made, the process 800 proceeds to operation 816 wherein an encoded frame is generated based on the QP value previously set, which encoded frame is then transmitted as part of the output video stream at operation 818. In an implementation, the determination at operation 808 may be coded using a flag.

If it is determined at operation 808 that an adjustment to video resolution needs to be made, the process 800 proceeds to operation 810, which determines whether the necessity for the adjustment is due to the input frame encoding bitrate undershooting or overshooting the target bitrate. In the event of an overshot, one or more encoding parameters are adjusted at operation 812, for example, by decreasing the resolution of the video stream. In the event of an undershot, one or more encoding parameters are adjusted at operation 814, for example, by increasing the resolution of the video stream.

In an implementation, the adjustment to video resolution may be determined using a square root of the weighted inverse of the percent bitrate deviation, such as $S_{new}=\sqrt{(1/(\alpha*B_{dev}))}$, where $S_{new}$ represents the new scaling per-dimension ratio of the resolution, $\alpha$ represents a weighting parameter, and $B_{dev}$ represents the deviation from the bitrate range. For example, where encoding an input frame results in a less than twenty percent overshoot and the weighting parameter is set to one, the input frame of a video stream having a resolution of 1280×720 may be scaled by $S_{new}=\sqrt{(1/(1*1.2))}=0.913$, thereby resulting in a new streaming resolution of 1168×657. Similarly, where encoding an input frame results in a severe undershoot of fifty percent, the scaling ratio may become $S_{new}=\sqrt{(1/(1*0.5))}=1.414$. In this way, the resolution video stream may be adjusted such that it is encoded at 1810×1018. Adjusting the weighting parameter a above 1 may result in a new frame bitrate encoded closer to a middle value for the acceptable range (e.g., 150 kbps for a range of 100 to 200 kbps).

After an adjustment to the video resolution is made, the process 800 proceeds to operation 816 wherein an encoded frame corresponding to the input frame is encoded as part of a second pass of the video stream. The encoded frame is thereafter transmitted as part of the output video stream at operation 818.

Resolution scaling may provide further benefits beyond those described above. For example, resolution scaling may improve performance for encoders that have not found an acceptable motion vector for inter prediction with the established motion search window area. This typically results in poor compression due to over-use of intra prediction. By downscaling the video stream in such a situation, the bitrate is decreased because there are fewer pixels to encode, and the amount of absolute motion in the video stream is also decreased. This may improve utilization of the search window.

In an implementation, and in response to determining an undershoot at operation 810, operation 814 includes decreasing the size of the motion search area, which may also be done in lieu of or in addition to decreasing the video resolution. Similarly, in response to determining an overshoot at operation 810, operation 812 includes increasing the size of the motion search area in lieu of or in addition to increasing the video resolution. In an implementation, changes to the size of the motion search area are made only for certain color components of the input frame, for example, the luminance and/or chrominance pixel values thereof.

In an implementation, one or more encoder limitations with respect to the motion search area may be identified, for example, in response to encoding the input frame at operation 804. The encoder limitations may indicate instances wherein a motion vector found by encoder 500 exceeds a threshold value, for example, where the video stream includes fast moving scenes including an amount of motion exceeding an ability of the encoder 500 to adequately represent the scenes at a given resolution. In an implementation, the resolution of the video stream may be decreased in response to the encoder limitations indicating that the motion vector exceeds the threshold value.

In an implementation, the size of the motion search area is not subject to change. For example, where the encoder 500 is implemented as a hardware encoder, the motion search area may be statically set to a size of N×M, wherein N and M may be the same or different values. The motion search area may thus only cover a portion of an input frame if the resolution of the video stream is higher than N×M. A midpoint location of the motion search area may be defined, for example, with respect to an initial reference location of an initial portion of the input frame to be covered (e.g., a midpoint location of a current block or slice to be coded). However, in an implementation, the resolution of the video stream may be decreased in order to, for example, improve the ability of the encoder 500 to detect motion within the motion search area by causing the motion search area to cover a larger portion of the input frame. The decision to decrease the resolution in this manner (e.g., as part of determining whether to adjust encoding parameters at operation 808) may be made, for example, based on a threshold value or other encoder limitation relative to the motion search area, as discussed above. Decreasing the resolution causes the midpoint location of the motion search area to be reset based on a reference location of the portion of the input frame resultingly covered by the motion search area. Similarly, in an implementation, the resolution of the video stream may be increased based on a threshold value or other encoder limitation. For example, where the resolution is lower than the size of the motion search area (e.g., where the motion search area would cover more than the entire input frame), the encoder 500 may increase the resolution of the video stream to equal the size of the motion search area. The midpoint location of the motion search area would thus be or remain, as applicable, at the reference location of the input frame. As used herein, the term "midpoint" refers to a centered position relative to corresponding dimensions.

Although the one or more encoder limitations with respect to the motion search area are discussed herein with respect to the two-pass encoding of FIG. 8, they also have application in a single-pass encoding context, such as discussed with respect to FIG. 7. For example, adjusting the encoding parameters of a first frame of the video stream may include identifying encoder limitations with respect to a motion search area (e.g., as part of determining a trigger adjustment at operation 708) and decreasing (or increasing) the resolution of the video stream based on the encoder limitations. In an implementation, changing the resolution in this manner results in a midpoint location of the motion search area being reset with respect to a reference location of the portion of the first frame resultingly covered by the motion search area.

In another implementation where the encoder 500 is a hardware encoder, the parameters of a motion search remain the same from block-to-block and frame-to-frame except that the midpoint location of the motion search area changes with the block of the frame being encoded. Hence, when the resolution is changed, more or less motion may be captured by the change in resolution. For example, changing the resolution may provide a better match for certain blocks within the frame, and hence lower residuals, when there is fast motion as the lower resolution captures more movement within the same search area.

The target bitrate set in the initial operations of processes 700 and 800 may be a variable bitrate subject to fluctuation. This fluctuation may result from a change in connection speed or network connection type for a user streaming a video. For example, where a user is initially streaming a video over a WiFi connection that becomes unavailable, the video streaming may switch to an LTE connection. In that each network connection type may be indicative of its own target bitrate for optimally viewing a given video stream at a given resolution, it may be desirable to utilize implementations the disclosed rate control processes for single-pass encoding and two-pass encoding for variable target bitrates.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 202 and/or the receiving station 206 (and the algorithms, methods, instructions, etc., stored thereon and/or executed thereby, including by the encoder 500 and the decoder 600) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 202 and the receiving station 206 do not necessarily have to be implemented in the same manner.

Further, in one aspect, for example, the transmitting station 202 or the receiving station 206 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

The transmitting station 202 and the receiving station 206 can, for example, be implemented on computers in a video conferencing system. Alternatively, the transmitting station 202 can be implemented on a server and the receiving station 206 can be implemented on a device separate from the server, such as a hand-held communications device. In this instance, the transmitting station 202 can encode content using an encoder 500 into an encoded video signal and transmit the encoded video signal to the communications device. In turn, the communications device can then decode the encoded video signal using a decoder 600. Alternatively, the communications device can decode content stored locally on the communications device, for example, content that was not transmitted by the transmitting station 202. Other suitable transmitting and receiving implementation schemes are available. For example, the receiving station 206 can be a generally stationary personal computer rather than a portable communications device and/or a device including an encoder 500 may also include a decoder 600.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus, comprising:
at least one processor configured to execute instructions stored in a non-transitory storage medium to:
identify a first frame of a video stream;
encode the first frame at a first bitrate representative of a quantization parameter;
compare the first bitrate to a target bitrate for the first frame and compare the quantization parameter to one of a minimum quantization threshold or a maximum quantization threshold, the minimum quantization threshold and the maximum quantization threshold corresponding to a resolution of the video stream, the minimum quantization threshold used when the first bitrate is less than the target bitrate, the maximum quantization threshold used when the first bitrate is greater than the target bitrate;
adjust at least one encoding parameter in response to comparing the first bitrate to the target bitrate and comparing the quantization parameter to the one of the minimum quantization threshold or the maximum quantization threshold;
identify a second frame of the video stream;
encode the second frame at a second bitrate according to the adjusted at least one encoding parameter; and
transmit the encoded first frame and the encoded second frame in an output bitstream,
wherein, when the first bitrate is less than the target bitrate and the quantization parameter is less than or equal to the minimum quantization threshold, adjusting the at least one encoding parameter comprises:
increasing the resolution of the video stream;
increasing the quantization parameter; and
adjusting the minimum quantization threshold and the maximum quantization threshold based on the increased resolution, and
wherein, when the first bitrate is greater than the target bitrate and the quantization parameter is greater than or equal to the maximum quantization threshold, adjusting the at least one encoding parameter comprises:

decreasing the resolution of the video stream;
decreasing the quantization parameter; and
adjusting the minimum quantization threshold and the maximum quantization threshold based on the decreased resolution.

2. The apparatus of claim 1, wherein, if the first bitrate is less than the target bitrate and the quantization parameter is greater than the minimum quantization threshold, adjusting the at least one encoding parameter comprises:
decreasing the quantization parameter.

3. The apparatus of claim 1, wherein, if the first bitrate is greater than the target bitrate and the quantization parameter is less than the maximum quantization threshold, adjusting the at least one encoding parameter comprises:
increasing the quantization parameter.

4. The apparatus of claim 1, the instructions further comprising instructions to identify one or more encoder limitations with respect to a motion search area in response to encoding the first frame,
wherein adjusting the at least one encoding parameter comprises:
decreasing the resolution of the video stream based on the one or more encoder limitations;
determining a reference location of the first frame at the decreased resolution; and
resetting a midpoint location of the motion search area based on the reference location of the first frame.

5. The apparatus of claim 1 wherein the at least one encoding parameter comprises at least one of the resolution of the video stream, the quantization parameter, the minimum quantization threshold, or the maximum quantization threshold.

6. An apparatus, comprising:
at least one processor configured to execute instructions stored in a non-transitory storage medium to:
identify an input frame of a video stream;
encode the input frame using an input quantization parameter;
identify one or more encoder limitations with respect to a motion search area of the encoded input frame;
adjust a resolution of the video stream based on the one or more encoder limitations;
determine a reference location of the input frame at the adjusted resolution;
reset a midpoint location of the motion search area based on the reference location of the input frame;
generate an encoded frame by encoding the input frame according to at least one of the adjusted resolution or the reset midpoint location; and
transmit the encoded frame in an output bitstream.

7. The apparatus of claim 6, responsive to generating the number of bits, indicate wherein adjusting the resolution of the video stream based on the one or more encoder limitations comprises:
increasing the resolution of the video stream based on the one or more encoder limitations.

8. The apparatus of claim 6, wherein adjusting the resolution of the video stream based on the one or more encoder limitations comprises:
decreasing the resolution of the video stream based on the one or more encoder limitations.

9. The apparatus of claim 6, wherein at least one of the input quantization parameter or an encoding quantization parameter used to generate the encoded frame at the adjusted resolution is also adjusted based on the one or more encoder limitations.

10. The apparatus of claim 6, wherein the input quantization parameter is a constant.

11. An apparatus, comprising:
at least one processor configured to execute instructions stored in a non-transitory storage medium to:
identify an input frame of a video stream;
encode the input frame at a first bitrate representative of a constant quantization parameter;
compare the first bitrate to a minimum target bitrate and a maximum target bitrate for the input frame;
in response to comparing the first bitrate to the minimum target bitrate and the maximum target bitrate, identify one or more encoder limitations with respect to a motion search area of the input frame;
adjust a resolution of the video stream based on the one or more encoder limitations;
determine a reference location of the input frame at the adjusted resolution;
reset a midpoint location of the motion search area based on the reference location of the input frame;
generate an encoded frame by encoding the input frame according to at least one of the adjusted resolution or the reset midpoint location; and
transmit the encoded frame in an output bitstream.

12. The apparatus of claim 11, wherein, if the first bitrate is less than the minimum target bitrate, adjusting the resolution of the video stream comprises increasing the resolution of the video stream and generating the encoded frame comprises encoding the input frame at the increased resolution.

13. The apparatus of claim 11, wherein, if the first bitrate is greater than the maximum target bitrate, adjusting the resolution of the video stream comprises decreasing the resolution of the video stream and generating the encoded frame comprises encoding the input frame at the decreased resolution.

14. The apparatus of claim 11, wherein adjusting the resolution of the video stream based on the one or more encoder limitations comprises:
increasing the resolution of the video stream based on the one or more encoder limitations.

15. The apparatus of claim 11, wherein adjusting the resolution of the video stream based on the one or more encoder limitations comprises:
decreasing the resolution of the video stream based on the one or more encoder limitations.

16. The apparatus of claim 11, wherein adjusting the resolution of the video stream based on the one or more encoder limitations comprises adjusting at least one encoding parameter of the video stream based on the one or more encoder limitations, wherein the at least one encoding parameter comprises at least one of the constant quantization parameter, the minimum target bitrate, the maximum target bitrate, an encoding quantization parameter, or the resolution of the video stream.

* * * * *